(12) United States Patent
Ayukawa et al.

(10) Patent No.: US 12,468,054 B2
(45) Date of Patent: Nov. 11, 2025

(54) RADIATION DETECTOR MODULE WITH LOCAL PROCESSING UNIT

(71) Applicant: REDLEN TECHNOLOGIES, INC., Saanichton (CA)

(72) Inventors: Michael Ayukawa, Victoria (CA); James Fujimoto, Saanichton (CA); Krzysztof Iniewski, Port Moody (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 208 days.

(21) Appl. No.: 18/462,859

(22) Filed: Sep. 7, 2023

(65) Prior Publication Data

US 2024/0085577 A1 Mar. 14, 2024

Related U.S. Application Data

(60) Provisional application No. 63/375,187, filed on Sep. 9, 2022.

(51) Int. Cl.
*G01T 1/24* (2006.01)
*G06F 15/78* (2006.01)

(52) U.S. Cl.
CPC .............. *G01T 1/243* (2013.01); *G01T 1/247* (2013.01); *G06F 15/7807* (2013.01)

(58) Field of Classification Search
CPC ...... G01T 1/243; G01T 1/247; G06F 15/7807
See application file for complete search history.

(56) References Cited

U.S. PATENT DOCUMENTS

| | | |
|---|---|---|
| 6,470,065 B1 | 10/2002 | Lauther |
| 6,990,176 B2 | 1/2006 | Sherman et al. |
| 7,327,866 B2 | 2/2008 | Bae et al. |
| 8,120,683 B1 | 2/2012 | Tumer et al. |
| 9,202,961 B2 | 12/2015 | Chen et al. |
| 9,835,737 B1* | 12/2017 | Czarnecki ........... G01T 1/20185 |
| 10,396,109 B2 | 8/2019 | Iniewski et al. |
| 11,067,707 B2 | 7/2021 | Crestani et al. |
| 2001/0025928 A1 | 10/2001 | Lingren et al. |

(Continued)

FOREIGN PATENT DOCUMENTS

| | | |
|---|---|---|
| JP | 4934826 B2 | 5/2012 |
| WO | WO2013/050229 A1 | 4/2013 |

OTHER PUBLICATIONS

European Patent Office Communication, Extended European Search Report for EP Application No. 23195854.7, mailed Jan. 26, 2024, 7 pages.

(Continued)

*Primary Examiner* — Blake C Riddick
(74) *Attorney, Agent, or Firm* — THE MARBURY LAW GROUP PLLC

(57) ABSTRACT

An X-ray detector module of a multi-module X-ray detector array having a local processing unit configured to provide real-time control and computational capabilities at the x-ray detector module. In various embodiments, by providing these capabilities in the detector module itself, as opposed to a component located downstream of the detector module, there may be an immediate cost reduction, opportunities to include additional features, and performance improvement opportunities not otherwise practical to implement in conventional X-ray imaging systems.

32 Claims, 11 Drawing Sheets

(56) References Cited

U.S. PATENT DOCUMENTS

| | | | |
|---|---|---|---|
| 2003/0058998 A1 | 3/2003 | Aufrichtig et al. | |
| 2004/0135091 A1* | 7/2004 | Nolewaika | G01T 1/2985 250/370.09 |
| 2004/0149924 A1* | 8/2004 | Russell | G01T 1/243 250/394 |
| 2007/0003006 A1* | 1/2007 | Tkaczyk | G01T 1/242 378/19 |
| 2008/0230708 A1* | 9/2008 | Enomoto | H04N 23/30 250/370.08 |
| 2013/0108019 A1 | 5/2013 | Tkaczyk et al. | |
| 2014/0003572 A1* | 1/2014 | Gregerson | A61B 6/56 378/4 |
| 2015/0055761 A1* | 2/2015 | Tredwell | H04N 25/30 378/207 |
| 2017/0269238 A1* | 9/2017 | Danielsson | G01T 1/244 |
| 2017/0290555 A1 | 10/2017 | Iniewski et al. | |
| 2018/0120455 A1* | 5/2018 | Eismann | A61B 6/4411 |
| 2019/0154851 A1* | 5/2019 | Wieczorek | G01T 1/242 |
| 2019/0339402 A1 | 11/2019 | Crestani et al. | |
| 2020/0018865 A1* | 1/2020 | Kenig | G01T 1/249 |
| 2021/0204901 A1 | 7/2021 | Matsuda | |
| 2021/0285897 A1 | 9/2021 | Read et al. | |
| 2021/0307708 A1* | 10/2021 | Vallgren | A61B 6/037 |
| 2022/0045118 A1 | 2/2022 | Kumar et al. | |
| 2022/0061778 A1* | 3/2022 | Hosemann | H04N 23/30 |
| 2022/0334267 A1* | 10/2022 | Nishijima | A61B 6/4233 |
| 2023/0243985 A1 | 8/2023 | Bindley et al. | |
| 2023/0397878 A1* | 12/2023 | Aharon | G06T 7/0012 |

OTHER PUBLICATIONS

Ayukawa, M. et al., "Radiation Detector Module with Data Encryption Function," U.S. Appl. No. 18/975,415, filed Dec. 10, 2024, 91 pages.

European Patent Office Communication, Extended European Search Report for EP Application No. 22157726.5, mailed Jul. 25, 2022, 23 pages.

Goderer, E. et al., "A Four-Side-Buttable Photon Counting ASIC for Computed Tomography," 5th Workshop on Medical Applications of Spectroscopic X-Ray Detectors, Siemens Healthineers, (May 2019), 30 pages.

https://harvestimaging.com/blog/?p=1599, (Sep. 8, 2016), 17 pages.

Jerram, P. et al., "Teledyne's High Performance Infrared Detectors for Space Missions," Proceedings vol. 11180, International Conference on Space Optics—ICSO 2018; 111803D (2019) https://doi.org/10.1117/12.2536040.

Rajendran, K. et al., "Full field-of-view, high-resolution, photon-counting detector CT: technical assessment and initial patient experience," Phys Med Biol, vol. 66, No. 20, 10.1088/1361-6560/ac155e, Oct. 27, 2021; doi: 10.1088/1361-6560/ac155e.

* cited by examiner

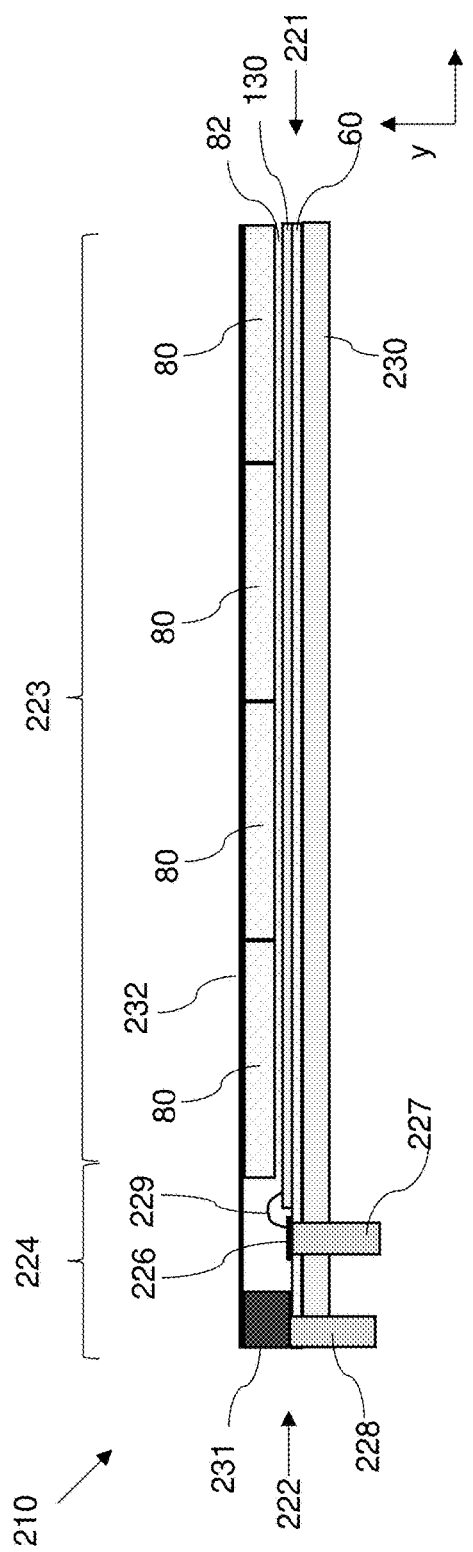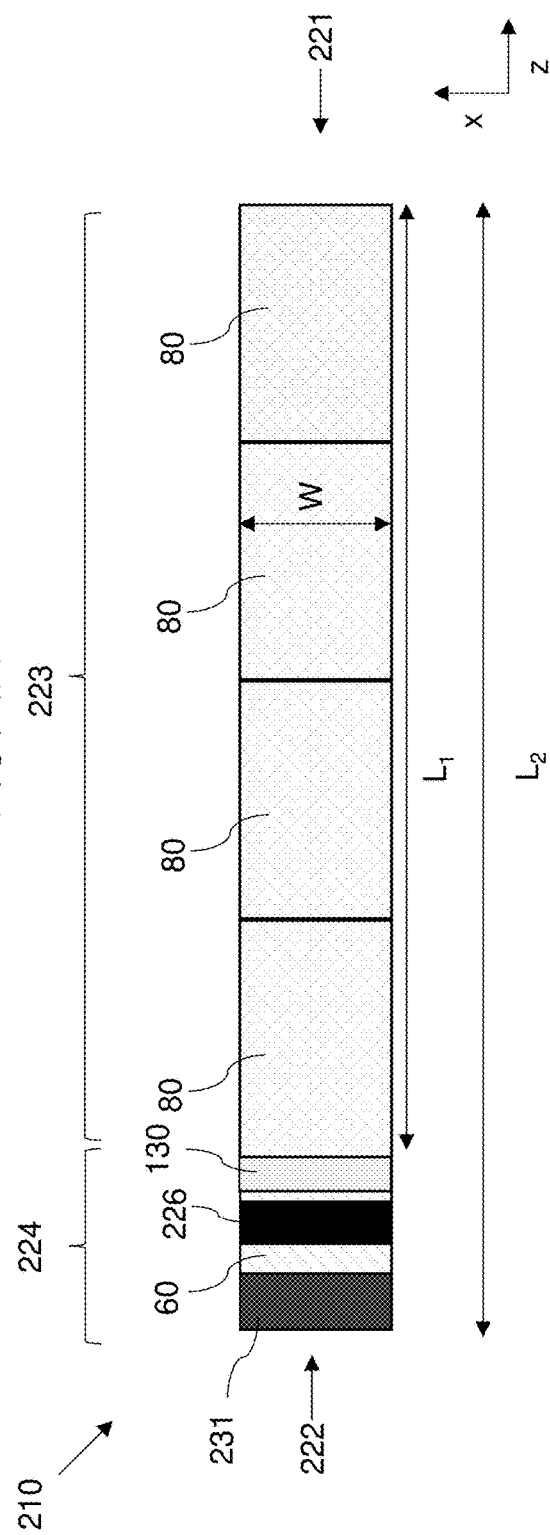
FIG. 4A
FIG. 4B

RADIATION DETECTOR MODULE WITH LOCAL PROCESSING UNIT

FIELD

The present disclosure relates generally to radiation detectors, and more specifically to radiation detector modules having a local processing unit providing control and data processing capabilities, and detector arrays and imaging systems incorporating such radiation detector modules.

BACKGROUND

Room temperature pixelated radiation detectors made of semiconductors, such as cadmium zinc telluride ($Cd_{1-x}Zn_xTe$ where $0<x<1$, or "CZT"), are gaining popularity for use in medical and non-medical imaging. These applications use the high energy resolution and sensitivity of the radiation detectors.

SUMMARY

According to an aspect of the present disclosure, a detector module includes at least one radiation sensor, a read-out circuit coupled to the at least one radiation sensor and configured to receive event detection signals from the at least one radiation sensor and to convert the event detection signals to digital detection signals, and a local processing unit configured to control the operation of the detector module and to perform processing operations on the digital detection signals prior to transmitting the digital detector signals from the detector module.

Further embodiments include detector arrays including a plurality of the above-described detector modules, where the radiation sensors of the plurality of detector modules form a continuous detector surface of the detector array.

Further embodiments include X-ray imaging systems including a radiation source configured to emit an X-ray beam, and a detector array including a plurality of the above-described detector modules that are configured to receive the X-ray beam from the radiation source through an intervening space configured to contain an object therein.

BRIEF DESCRIPTION OF THE DRAWINGS

FIG. 4A is a side view of an alternative configuration of a radiation detector unit according to various embodiments of the present disclosure.

FIG. 4B is a top view of the radiation detector unit of FIG. 4A.

DETAILED DESCRIPTION

Embodiments of the present disclosure provide radiation detector units, detector modules and detector arrays formed by assembling the detector units, and methods of manufacturing the same, the various aspects of which are described herein with reference to the drawings.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

Figure 1A:
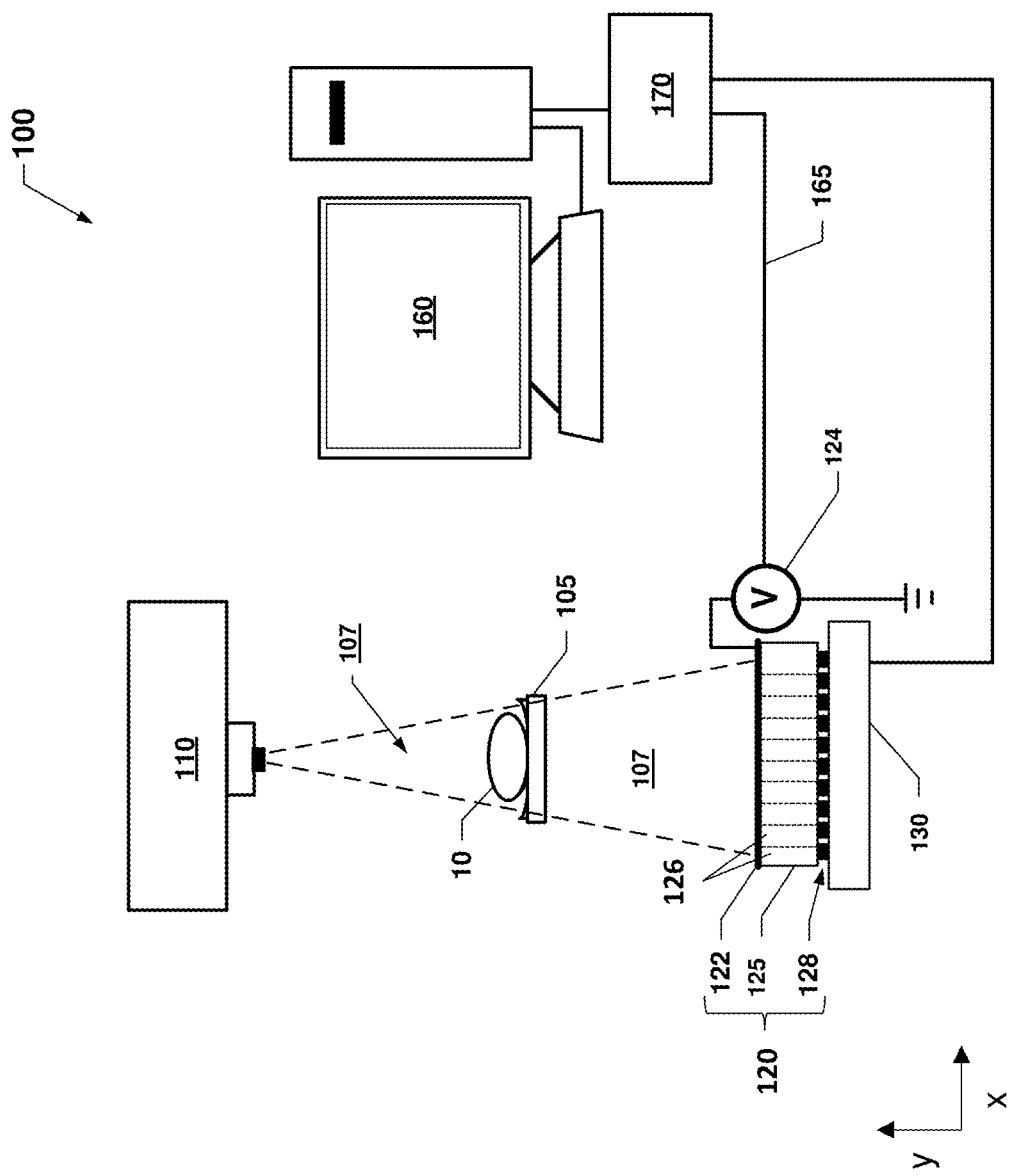
FIG. 1A is a functional block diagram of an X-ray imaging system in accordance with various embodiments of the present disclosure.

FIG. 1A is a functional block diagram of an X-ray imaging system 100 in accordance with various embodiments. The X-ray imaging system 100 may include an X-ray source 110 (i.e., a source of ionizing radiation), and an energy discriminating photon counting radiation detector 120. The X-ray imaging system 100 may additionally include a patient support structure 105, such as a table or frame, which may rest on the floor and may support an object 10 to be scanned. In some embodiments, the object 10 may be a biologic subject (i.e., a human or animal patient). The support structure 105 may be stationary (i.e., non-moving) or may be configured to move relative to other elements of the X-ray imaging system 100, such as the X-ray source.

The X-ray source 110 is typically mounted to a gantry and may move or remain stationary relative to the object 10. The X-ray source 110 is configured to deliver ionizing radiation to the radiation detector 120 by emitting an X-ray beam 107 toward the object 10 and the radiation detector 120. After the X-ray beam 107 is attenuated by the object 10, the beam of radiation 107 is received by the radiation detector 120.

The radiation detector 120 may be controlled by a high voltage bias power supply 124 that selectively creates an electric field between an anode 128 and cathode 122 pair coupled thereto. In one embodiment, the radiation detector 120 includes a plurality of anodes 128 (e.g., one anode per pixel) and one common cathode 122 electrically connected to the power supply 124 and facing the X-ray source 110. The radiation detector 120 may include a detector material 125, such as a semiconductor material disposed between the anode 128 and cathode 122 and thus configured to be exposed to the electrical field therebetween. The semiconductor material may comprise any suitable semiconductor material for detecting X-ray radiation disposed between the anode 128 and cathode 122 and thus configured to be exposed to the electrical field therebetween. In various embodiments, the semiconductor material of the radiation detector 120 may comprise a II-VI semiconductor material, such as cadmium telluride, cadmium zinc telluride (i.e., CdZnTe or "CZT"), cadmium selenide telluride, and cadmium zinc selenide telluride. Other suitable semiconductor materials are within the contemplated scope of disclosure.

A read-out application specific integrated circuit (ASIC) 130 coupled to the anode(s) 128 may receive signals (e.g., charge or current) from the anode 128(s) and be configured to provide data to and by controlled by a control unit 170. The radiation detector 120 may be segmented or configured into a large number of small "pixel" detectors 126. In various embodiments, the pixel detectors 126 of the radiation detector 120 and the ASIC 130 are configured to output data that includes counts of photons detected in each pixel detector in each of a number of energy bins. Thus, radiation detectors 120 of various embodiments provide both two-dimensional detection information regarding where photons were detected, thereby providing image information, and measurements of the energy of the detected X-ray photons. A radiation detector 120 that is capable of measuring the energy of the X-ray photons impinging on the detector 120 may be referred to as an energy-discriminating radiation detector 120.

The control unit 170 may be configured to synchronize the X-ray source 110, the read-out ASIC 130, and the high voltage bias power supply 124. The control unit 170 may be coupled to and operated from a computing device 160. Alternatively, the computing device 160 and the control unit 170 may be integrated together as one device.

In some embodiments, the X-ray imaging system 100 may be a computed tomography (CT) imaging system. The CT imaging system 100 may include a gantry (not shown in FIG. 1A), which may include a moving part, such as a circular, rotating frame with the X-ray source 110 mounted on one side and the radiation detector 120 mounted on the other side. The radiation detector 120 may have a curved shape along its long axis (i.e., the x-axis direction in FIG. 1A) such that each of the pixel detectors along the length of the radiation detector may face towards the focal spot of the X-ray source 110. The gantry may also include a stationary (i.e., non-moving) part, such as a support, legs, mounting frame, etc., which rests on the floor and supports the moving part. The X-ray source 110 may emit a fan-shaped or cone-shaped X-ray beam 107 as the X-ray source 110 and the radiation detector 120 rotate on the moving part of the gantry around the object 10 to be scanned. After the X-ray beam 107 is attenuated by the object 10, the X-ray beam 107 is received by the radiation detector 120. The curved shape of the radiation detector 120 may allow the CT imaging system 100 to create a 360° continuous circular ring of the image of the object 10 by rotating the moving part of the gantry around the object 10.

For each complete rotation of the X-ray source 110 and the radiation detector 120 around the object 10, one cross-sectional slice of the object 10 may be acquired. As the X-ray source 110 and the radiation detector 120 continue to rotate, the radiation detector 120 may take numerous snapshots called "views". Typically, about 1,000 profiles are taken in one rotation of the X-ray source 110 and the radiation detector 120. The X-ray source 110 and the detector 120 may slowly move relative to the patient along a horizontal direction (i.e., into and out of the page in FIG. 1A) so that the detector 120 may capture incremental cross-sectional profiles over a region of interest (ROI) of the object 10, which may include the entire object 10. The data acquired by the radiation detector 120 and output by the read-out ASIC 130 may be passed along to the computing device 160 that may be located remotely from the radiation detector 120 via a connection 165. The connection 165 may be any type of wired or wireless connection. If the connection 165 is a wired connection, the connection 165 may include a slip ring electrical connection between any structure (e.g., gantry) supporting the radiation detector 120 and a stationary support part of the support structure, which supports any part (e.g., a rotating ring). If the connection 165 is a wireless connection, the radiation detector 120 may contain any suitable wireless transceiver to communicate data with another wireless transceiver that is in communication with the computing device 160. The computing device 160 may include processing and imaging applications that analyze each profile obtained by the radiation detector 120, and a full set of profiles may be compiled to form a three-dimensional computed tomographic (CT) reconstruction of the object 10 and/or two-dimensional images of cross-sectional slices of the object 10.

Various alternatives to the design of the X-ray imaging system 100 of FIG. 1A may be employed to practice embodiments of the present disclosure. X-ray imaging systems may be designed in various architectures and configurations. For example, an X-ray imaging system may have a helical architecture. In a helical X-ray imaging scanner, the X-ray source 110 and radiation detector 120 are attached to a freely rotating gantry. During a scan, a table moves the object 10 smoothly through the scanner, or alternatively, the X-ray source 110 and detector 120 may move along the length of the object 10, creating helical path traced out by the X-ray beam. Slip rings may be used to transfer power and/or data on and off the rotating gantry. In other embodiments, the X-ray imaging system may be a tomosynthesis X-ray imaging system. In a tomosynthesis X-ray scanner, the gantry may move in a limited rotation angle (e.g., between 15 degrees and 60 degrees) in order to detect a cross-sectional slice of the object 10. The tomosynthesis X-ray scanner may be able to acquire slices at different depths and with different thicknesses that may be reconstructed via image processing.

Figure 1B:
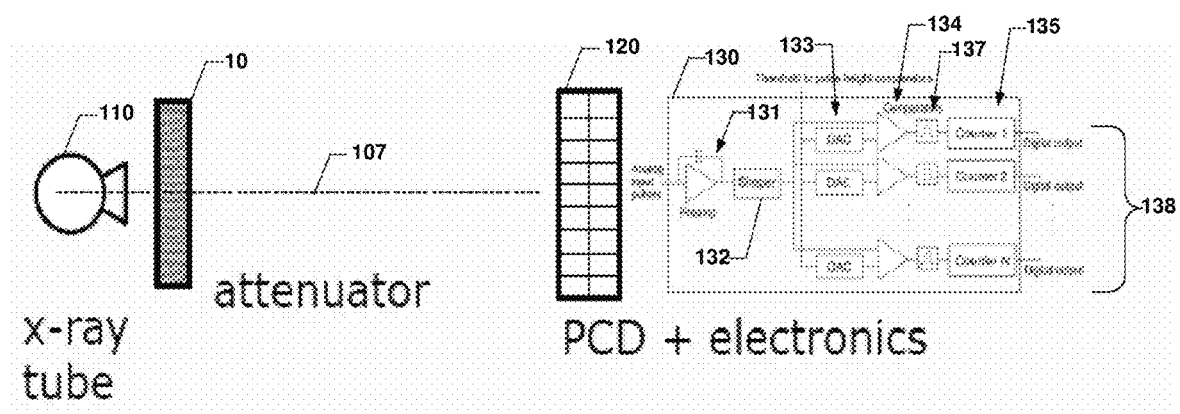
FIG. 1B is a schematically illustration of an application specific integrated circuit (ASIC) configured to count X-ray photons detected in each pixel detector within a set of energy bins according to various embodiments of the present disclosure.

FIG. 1B illustrates components of an X-ray imaging system, including components within the ASIC 130 configured to count X-ray photons detected in each pixel detector within a set of energy bins. As used herein, the terms "energy bin" and "bin" refer to a particular range of measured photon energies between a minimum energy threshold and a maximum energy threshold. For example, a first bin may refer to counts of photons determined to have an energy greater than a threshold energy (referred to as a trigger threshold, e.g., 20 keV) and less than 40 keV, while a second bin may refer to counts of photons determined to have an energy greater than 40 keV and less than 60 keV, and so forth.

X-rays 107 from an X-ray source (e.g., X-ray tube) 110 may be attenuated by a target (e.g., an object 10, such as a human or animal patient) before interacting with the radiation detector material within the pixelated detector array 120. An X-ray photon interacting (e.g., via the photoelectric effect) with a pixelated radiation detector material generates an electron cloud within the material that is swept by an electric field to the anode electrode 128. The charge gathered on the anode creates a signal that is integrated by a charge sensitive amplifier (CSA) 131. There may be a CSA 131 for each pixel detector (e.g., for each anode 128) within the pixelated X-ray detector 120. The voltage of the CSA output signal may be proportional to the energy of the X-ray photon. The output signal of the CSA may be processed by an analog filter or shaper 132.

The filtered output may be connected to the inputs of a number of analog comparators 134, with each comparator connected to a digital-to-analog converter (DAC) 133 that inputs to the comparator a DAC output voltage that corresponds to the threshold level defining the limits of an energy bin. The detector circuitry 130 may be configured so that after the CSA voltage has stabilized (after the dead time), that voltage may be between two voltage thresholds set by two DACs 133, which determines the output of the comparators 134. Outputs from the comparators 134 may be processed through decision gates 137, with a positive output from a comparator 134 corresponding to a particular energy bin (defined by the DAC output voltages) resulting in a count added to an associated counter 135 for the particular energy bin. Periodically, the counts in each energy bin counter 135 are output as signals 138 to the control unit 170.

The detector array of an X-ray imaging system may include an array of radiation detector elements, referred to herein as pixel detectors. The signals from the pixel detectors may be processed by a pixel detector circuit, which may sort detected photons into energy bins based on the energy of each photon or the voltage generated by the received photon. When an X-ray photon is detected, its energy is determined and the X-ray photon count for its associated energy bin is incremented. For example, if the detected energy of an X-ray photon is 24 kilo-electron-volts (keV), the X-ray photon count for the energy bin of 20-40 keV may be incremented. The number of energy bins may be three or more, such as four to twelve. In an illustrative example, an X-ray photon counting detector may have four energy bins: a first bin for detecting photons having an energy between 20 keV and 40 keV, a second bin for detecting photons having an energy between 40 keV and 60 keV, a third bin for detecting photons having an energy between 60 keV and 90 keV, and a fourth bin for detecting photons having an energy above 90 keV (e.g., between 90 keV and 120 keV). The greater the total number of energy bins, the better the material discrimination. The total number of energy bins and the energy range of each bin may be selectable by a user, such as by adjusting the threshold levels defining the limits of the respective energy bins in the read-out ASIC 130 as shown in FIG. 1B.

In various embodiments, a radiation detector 120 for an X-ray imaging system 100 as described above may include a detector array including a plurality of pixel detectors 126 extending over a continuous two-dimensional (2D) detector array surface. A typical radiation detector 120 may include an array of individual radiation sensors (such as radiation sensors 80 described below and each containing a plate-like detector material 125 including cathode and anode electrode(s) 122, 128 defining pixel detectors 126 as described above) arranged side-by-side to provide the continuous 2D detector array surface. The detector array (which is also known as a detector module system (DMS)) may include a modular configuration including a plurality of detector modules, where each detector module may include at least one above-described radiation sensor, at least one ASIC 130 (also known as a read-out integrated circuit (ROIC)) electrically coupled to the at least one radiation sensor, and a module circuit board. The module circuit board may support transmission of electrical power, control signals, and data signals between the module circuit board and the at least one ASIC 130 and the at least one radiation sensor of the detector module, and may further support transmission of electrical power, control signals, and data signals between the module circuit board and the control unit 170 of the X-ray imaging system 100, other module circuit boards of the detector array, and/or a power supply for the detector array. A plurality of detector modules may be assembled on a common support structure, such as a detector array frame, to form a detector array.

Figure 2:
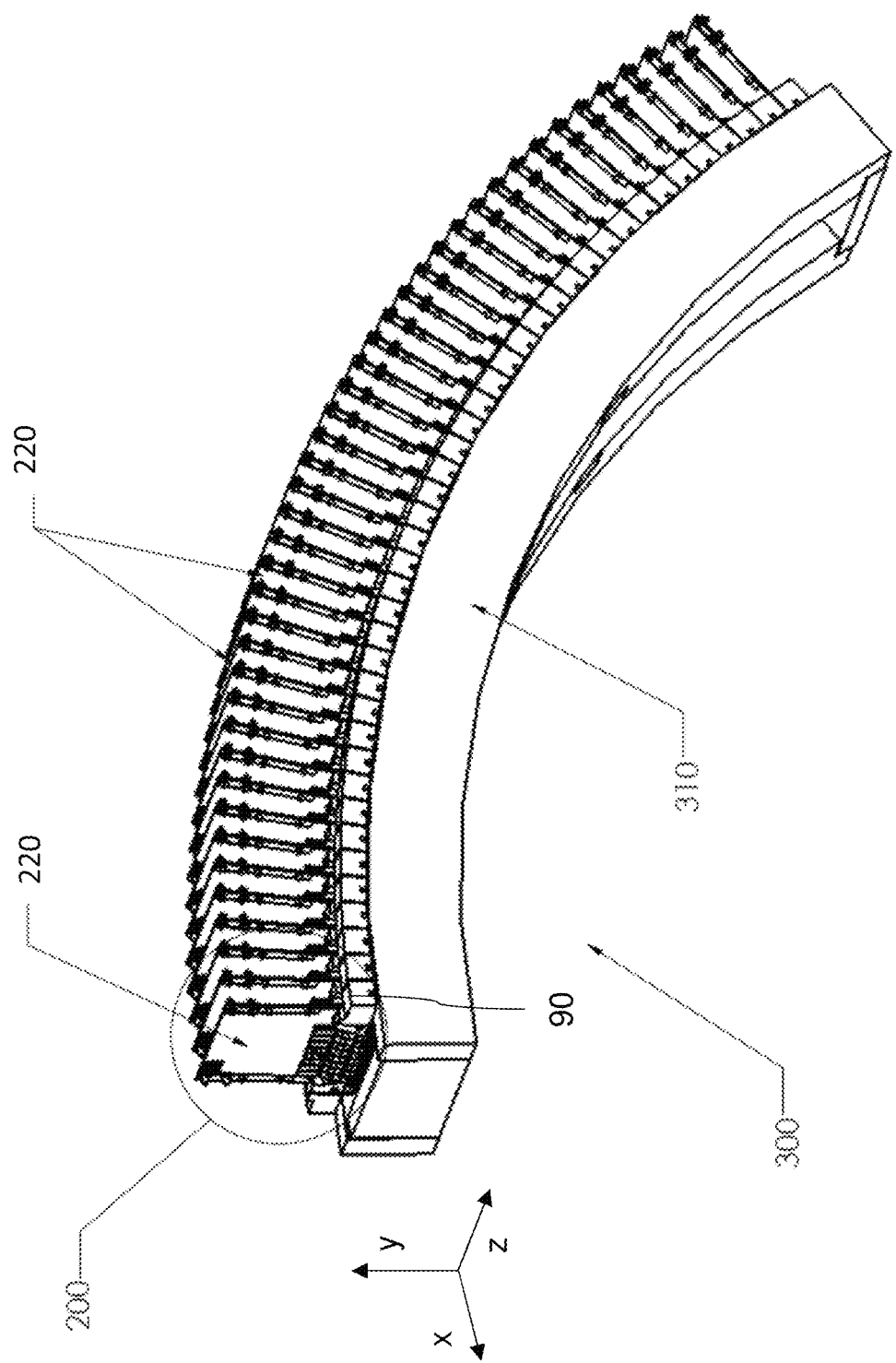
FIG. 2 is a perspective view of a detector array for a computed tomography (CT) X-ray imaging system according to various embodiment of the present disclosure.

FIG. 2 is a perspective view of a detector array 300 for a computed tomography (CT) X-ray imaging system according to various embodiment of the present disclosure. The detector array 300 in this embodiment includes multiple detector modules 200 mounted on a detector array frame 310. The detector array frame 310 may be configured to provide attachment of a row of detector modules 200 such that physically exposed surfaces of the radiation sensors of the detector modules 200 collectively form a curved detection surface located within a cylindrical surface. The multiple detector modules 200 may be assembled such that radiation sensors attached to neighboring detector modules 200 abut each other, i.e., make direct surface contact with each other and/or include a gap between adjacent radiation sensors that is less than 3 mm, and/or less than 2 mm, and/or less than 1 mm in the x-direction. In some embodiments, the detector modules 200 may be mounted to the detector array frame 310 by attaching frame bars 90 of the detector modules 200 to the detector array frame 310 using suitable mechanical fasteners. The radiation sensors and ASICs 130 of each module 200 may be mounted over a first (i.e., front) surface of the frame bar 90. Each module 200 may also include a module circuit board 220 extending away from a rear surface of the frame bar 90. Major surfaces of the module circuit boards 220 of the detector modules 200 may face each other in the detector array 300.

Figure 3A:
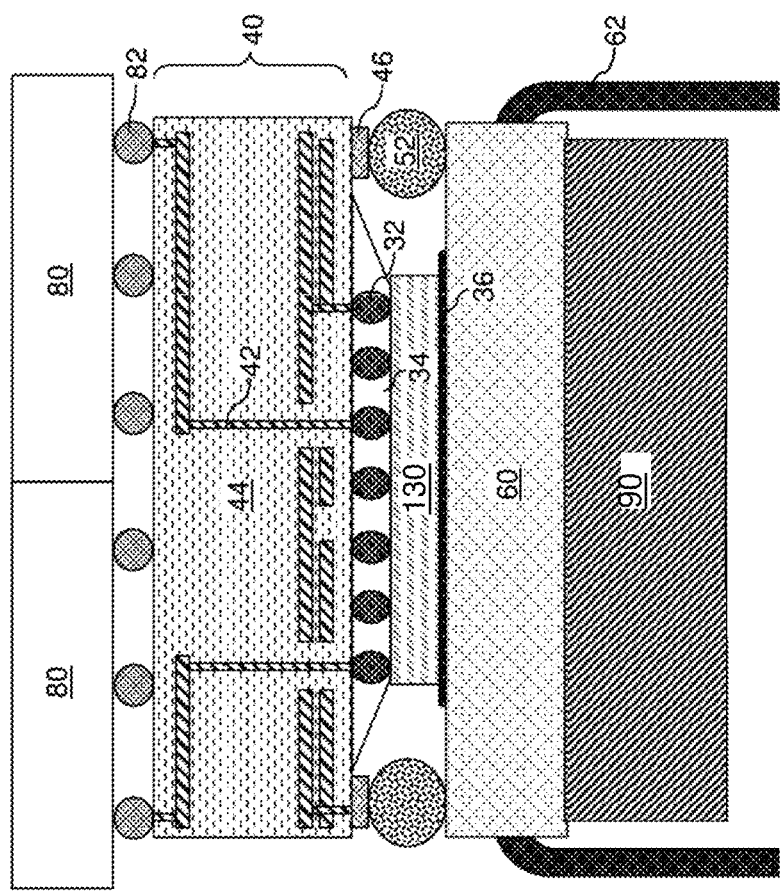
FIG. 3A is a vertical cross-sectional view of a radiation detector unit according to one embodiment of the present disclosure.

In some embodiments, each of the detector modules 200 of a detector array 400 may be constructed from a set of radiation detector units, which may also be referred to as "mini-modules" or "submodules." In some embodiments, each of the radiation detector units may include one or more radiation sensors coupled to a single ASIC 130. FIG. 3A is a vertical cross-sectional view of a radiation detector unit 210 according to one embodiment of the present disclosure. Referring to FIG. 3A, the radiation detector unit 210 includes a pair of above-described radiation sensors 80, an ASIC 130, and an interposer 40 disposed between the radiation sensors 80 and the ASIC 130. The interposer 40 includes an insulating interposer matrix 44, which may include semiconductor, glass, polymer (e.g., printed circuit board insulating laminate) or ceramic material, and a plurality of metal interconnect structures 42 embedded within the insulating interposer matrix 44. Bonding pads (not expressly shown) may be located on the front side and the backside of the interposer 40 and may be electrically coupled to the metal interconnect structures 42. As used herein, the "front side" of elements refers to the side that faces the incoming radiation, and the "backside" of elements refers to the side that is the opposite side of the front side.

The ASIC 130 may interface with external components through bonding pads that are located on the front side of the ASIC 130. The bonding pads may include input pads, output pads, and power pad. The bonding pad(s) of the ASIC 130 can be arranged as an array, such as a rectangular array. At least a portion of the bonding pads on the backside of the interposer 40 may have the same periodicity as the bonding pads on the front side of the ASIC 130.

Each of the radiation sensors 80 may have bonding pads located on the backside of the radiation sensor 80. The bonding pads on the backside of the radiation sensors 80 may be arranged as an array, such as a rectangular array. The front side bonding pads of the interposer 40 may have the same periodicity as the periodicity of bonding pads on the backside of the radiation sensors 80.

Referring again to FIG. 3A, the ASIC 130 may be mounted to the backside of the interposer 40 through an array of first bonding structures 32, such as solder balls or copper pillars. Specifically, the array of first bonding structures 32, may be bonded to a respective pair of a bonding pads on the front side of the ASIC 20 and a backside bonding pad of the interposer 40 employing a flip-chip bonding process (e.g., a C4 bonding process and/or a thermo-compression process in embodiments using copper pillar bonding structures). An insulating matrix 34 may be formed around the array of first bonding structures 32 to structurally reinforce the array of first bonding structures 32. While a configuration in which one ASIC 130 is bonded to the backside of the interposer 40 is illustrated herein, two or more ASICs 130 may be bonded to the backside of the interposer 40 in some embodiments. At least one radiation sensor 80 may be bonded to the front side of the interposer 40 via bonding material portions 82. In some embodiments, the bonding material portions 82 may include a low temperature solder material or conductive epoxy. In one embodiment, the at least one radiation sensor 80 includes a pair of radiation sensors 80 having a respective rectangular shape and adjoined to each other with no gap or with a gap less than 3 mm, and/or less than 2 mm, and/or less than 1 mm. X-ray photon detection signals from the radiation sensors 80 may be transmitted to the ASIC 130 via the interposer 40. The ASIC 130 may be configured to convert event detection signals from the at least one radiation sensor 80 to digital detection signals, which can include the pixel location and the energy range of the detected radiation.

The radiation detector unit 210 may further include a carrier board 60 and at least one flex cable assembly 62, which are configured to route power supply to the ASIC 130 and to the at least one radiation sensor 80, control signals to the ASIC 130, and data signals (e.g., digital detection signals) generated by the ASIC 130 and transmitted through the interposer 40. One end of each flex cable assembly 62 may be attached to a respective side of the carrier board 60, and another end of each flex cable assembly may be connected to a module circuit board 220 as shown in FIG. 2. The carrier board 60 may be a printed circuit board including an insulating substrate and printed interconnection circuits. A thermally conductive paste 36, such as a silver paste layer, may be provided between the backside of the ASIC 130 and the front side of the carrier board 60. An array of second solder balls 52 may each be bonded to a bonding pad 46 on the backside of the interposer 40 and a corresponding bonding pad (not expressly shown in FIG. 3A) on the front side of the carrier board 60. The second solder balls 52 may be located around and laterally spaced away from peripheral side surfaces of the ASIC 130. Each flex cable assembly 62 may include signal wires and power wires. The signal wires are configured to transmit the electronic detection signals and control signals, and the power wires are configured to provide electrical power to the interposer 40, which distributes the electrical power to the ASIC 130 and the radiation sensor(s) 80. In some embodiments, the flex cable assembly 62 can be more flexible (i.e., can bend with a lower application of force) than the carrier board 60.

The radiation sensors 80, the interposer 40, the ASIC 130 and the carrier board 60 may be mounted to a supporting substrate (e.g., a block) 90 as shown in FIG. 3A. The supporting substrate may include a high thermal conductivity material such as a metal (e.g., aluminum, copper, etc.). The supporting substrate 90 may function as a heat sink for the radiation detector unit 210. The supporting substrate 90 may be attached to the backside of the carrier board 60 using a thermally conductive adhesive such as a thermally conductive paste, and/or by mechanical connection structures (such as snap-in connectors, screws, and/or bolts and nuts).

Figure 3B:
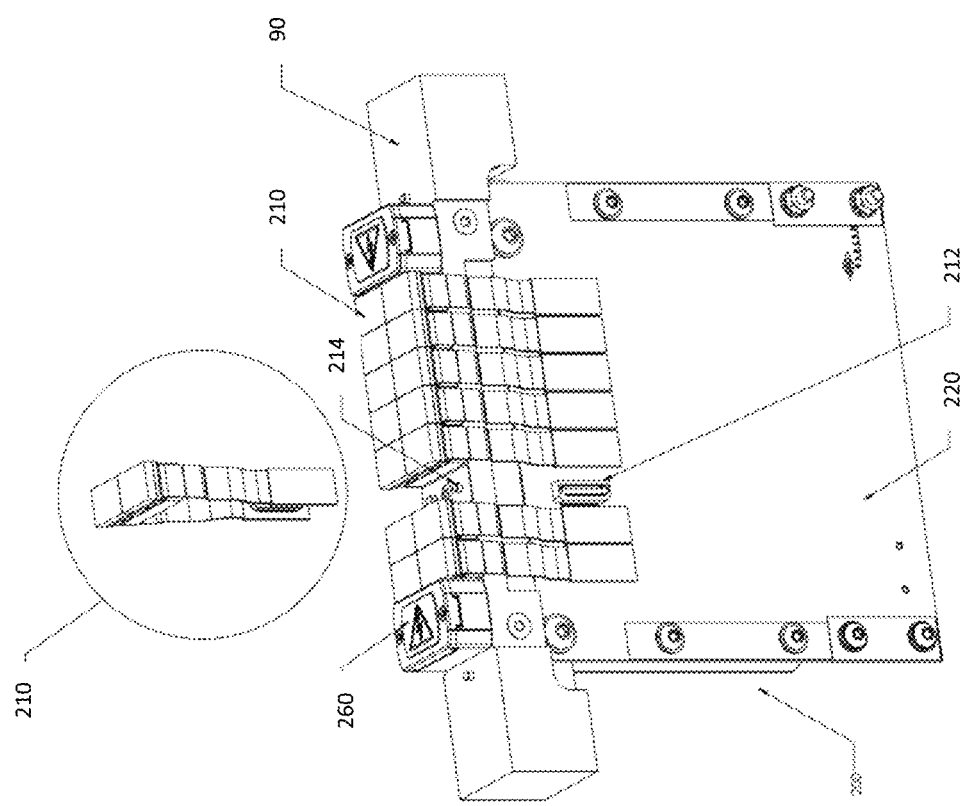
FIG. 3B is a perspective view of a detector module including a plurality of radiation detector units mounted to a frame bar according to various embodiments of the present disclosure.

FIG. 3B is a perspective view of a detector module 200 including a plurality of radiation detector units 210 mounted to an above-described frame bar 90. Referring to FIG. 3B, a row of radiation detector units 210 may be mounted to the front side of the frame bar 90. Engagement features 214 may optionally be provided on the front side of the frame bar 90 that may made with corresponding engagement features (not shown) on the backside of the supporting substrate 90 of each of the radiation detector units 210. End holders 260 may optionally be located at either end of the row of radiation detector units 210. A module circuit board 220 may be mechanically coupled to the frame bar 90 by suitable mechanical fastener(s). Each radiation detector unit 210 of the detector module may be electrically coupled to the module circuit board 220 by a flex cable assembly 62. In the embodiment shown in FIG. 3B, the module circuit board 220 may include board-side connectors 212, where each board-side connector 212 may be connected to a connector, such as a snap-in connector 66, of a respective flex cable.

FIGS. 4A and 4B are side and top views, respectively, of an alternative configuration of a radiation detector unit 210 according to various embodiments of the present disclosure. In the embodiment shown in FIGS. 4A and 4B, one or more radiation sensors 80 may be directly mounted to the front side of the ASIC 130 via bonding material portions 82, and no interposer or similar intervening structural component for routing of electrical signals between the radiation sensors 80 and the ASIC 130 is located between the backside of the one or more radiation sensors 80 and the front side of the ASIC 130. In the embodiment shown in FIGS. 4A and 4B, the radiation detector unit 210 includes four radiation sensors 80 mounted over the front surface of an ASIC 130, although a greater or lesser numbers (e.g., between 1-8) of radiation sensors 80 may be mounted over the front surface of the ASIC 130. The radiation sensors 80 may abut one another along the z-axis direction such that they provide a continuous radiation sensor area 223 extending along the z-axis direction. The continuous radiation sensor area 223 may extend to a first peripheral edge 221 of the radiation detector unit 210. The continuous radiation sensor area 223 may also extend across the entire width, W, of the radiation detector unit 210 along the x-axis direction, as shown in FIG. 4B. The radiation detector unit 210 may also include a peripheral area 224 that does not include any radiation sensors 80. The peripheral area 224 may be located between the continuous radiation sensor area 223 and a second peripheral edge 222 of the radiation detector unit 210 that is opposite the first peripheral edge 221. In various embodiments, a portion of the ASIC 130 may extend partway into the peripheral area 224 of the radiation detector unit 210 as shown in FIGS. 4A and 4B.

In various embodiments, the ASIC 130 may include an arrangement of electronic signal sensing channels and supporting logic circuitry in at least one monolithic component. The ASIC 130 may include an arrangement of circuit elements located on and/or within a single supporting substrate, which may be a semiconductor material substrate (e.g., a silicon substrate). The ASIC 130 may include core circuit blocks underlying respective radiation sensors 80 in the continuous radiation sensor area 223 of the radiation detector unit 210. The ASIC 130 may also include a peripheral circuit block in the peripheral area 224 of the radiation detector unit 210. A radiation sensor 80 may be bonded to each of the core circuit blocks of the ASIC 130 in the assembled radiation detector unit 100. The core circuit blocks may each include an array of bonding pads on the front surface of the ASIC 130 having a periodicity that corresponds to the periodicity of the pixel detectors of the radiation sensors 80, such that each of the bonding pads within a core circuit block of the ASIC 130 may be bonded to a respective pixel detector of a radiation sensor 80 via a bonding material portion 82. Each of the core circuit blocks may have length and width dimensions that correspond to the length and width dimensions of a radiation sensor 80 that is bonded to the core circuit block on the front side of the ASIC 130. Each of the core circuit blocks may also include additional circuit elements, such as electronic signal sensing channels and supporting logic circuitry. In some embodiments, each of the core circuit blocks of the ASIC 130 may include identical circuit elements in an identical layout as each of the other core circuit blocks of the ASIC 130. The peripheral circuit block of the ASIC 130 may include input/output (I/O) circuitry for the ASIC 130, including, for example, output bond pads for transmitting digitized radiation event detection signals from the ASIC 130, input bond pads for receiving control signals for the ASIC 130, and power pads for providing electrical power to the ASIC 130. In some embodiments, an ASIC 130 as described above may be fabricated using a photolithographic "stitching" process as described in U.S. Provisional Application No. 63/304,845 filed Jan. 31, 2022, the entire teachings of which are incorporated herein by reference.

Referring again to FIGS. 4A and 4B, the ASIC 130 may be located on a carrier board 60, which may be similar to the carrier board 60 described above with reference to FIGS. 3A and 3B. In some embodiments, an optional stiffening member 230 may be located on the backside of the carrier board 60 to provide increased mechanical support and stiffness to the radiation detector unit 210. The carrier board 60 and the optional stiffening member 230 may extend over the full length, $L_2$, of the radiation detector unit 210 between the first peripheral edge 221 and the second peripheral edge 222 of the radiation detector unit 210. At least one electrical connector 227, 228 may be electrically connected to the radiation detector unit 210. In the embodiment shown in FIG. 4A, a first electrical connector 227 may be electrically connected to a bond pad region 226 of the carrier board 60. At least one wire bond 229, which may be one or more reverse wire bonds, may electrically connect bond pads in the bond pad region 226 of the carrier board 60 with bond pads on the front side of the ASIC 130. The first electrical connector 227 and the wire bonds 229 may be configured to route power supply to the ASIC 130, control signals to the ASIC 130, and data signals generated by the ASIC 130. In some embodiments, the first electrical connector 227 may be a flex cable assembly as described above, although other suitable electrical connectors are within the contemplated scope of disclosure. Furthermore, although a single first electrical connector 227 is shown in FIG. 4A, it will be understood that multiple first electrical connectors 227 may be connected to the carrier board 60. A second electrical connector 228 may be a high voltage electrical connector that is used to selectively provide a bias voltage to the radiation sensors 80 (e.g., to the cathodes of the radiation sensors) of the radiation detector unit 210. The second electrical connector 228 may be electrically connected to an electrical filter assembly 231 that is configured to condition the voltage provided via the second electrical connector 228 to improve the stability of the bias voltage provided to the radiation sensors 80. As shown in FIG. 4A, a conductive member 232, which may comprise a metal foil sheet, may extend from the filter assembly 231 over the front side surfaces (e.g., cathodes) of the radiation sensors 80 to provide the bias voltage to the radiation sensors 80 (for purposes of clarity, the conductive member 232, the first and second electrical connectors 227, 228 and the wire bonds 229 are omitted in FIG. 4B).

Figure 5:
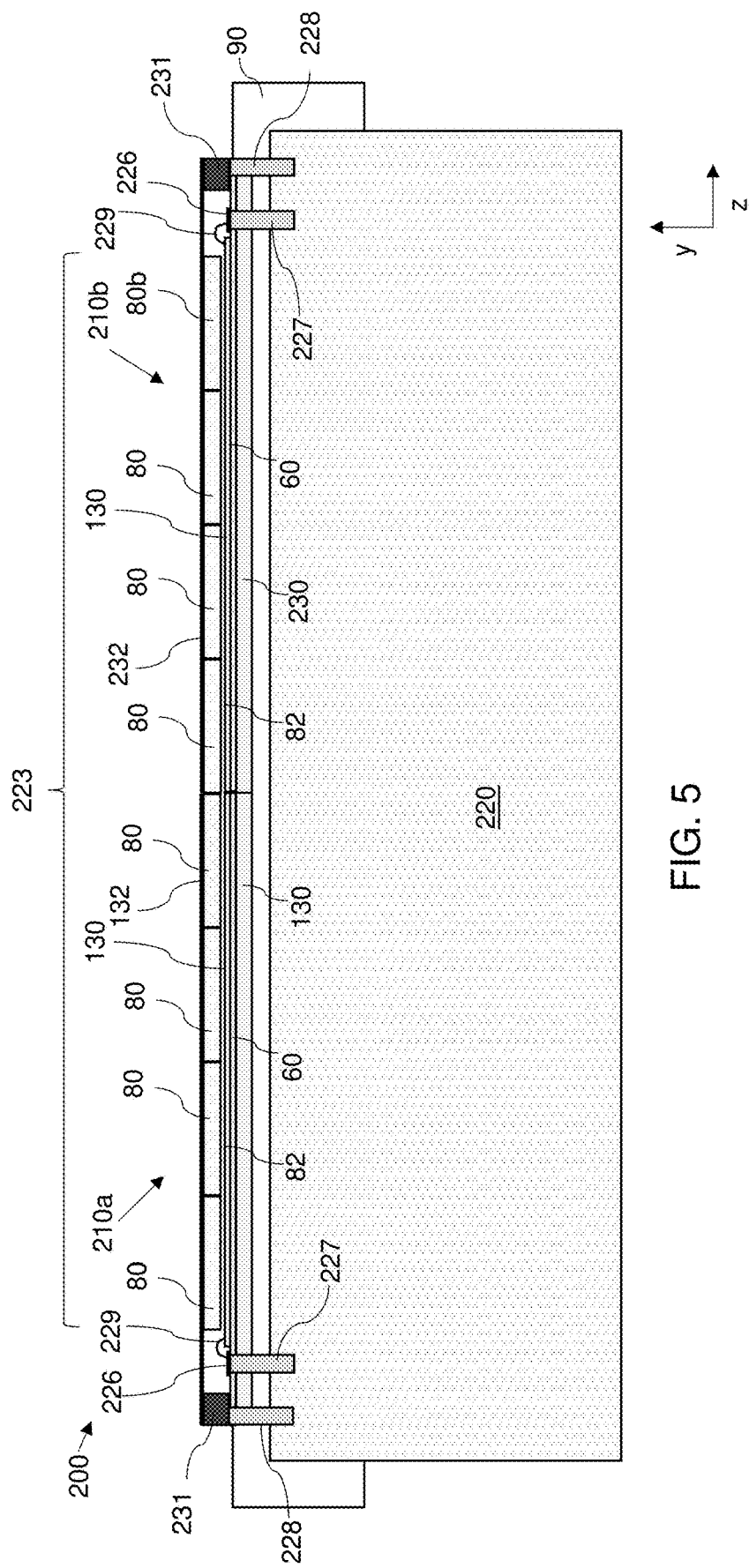
FIG. 5 is a side elevation view of a detector module including a plurality of radiation detector units according to an embodiment of the present disclosure.

FIG. 5 is a side elevation view of a detector module 200 including a plurality of radiation detector units 210a, 210b as described above with reference to FIGS. 4A and 4B. Referring to FIG. 5, a pair of above-described radiation detector units 210a, 210b may be arranged such that the first peripheral edges 221 of the radiation detector units 210a, 210b abut against one another. This may increase the effective length of the continuous radiation sensor area 223 along the z-axis direction as shown in FIG. 5. The pair of detector modules 210a and 210b may be mounted over the front surface of a frame bar 90 that may function as a substrate for structurally holding the radiation detector units 210a and 210b in a butted configuration as shown in FIG. 5. In some embodiments, the front surface of the frame bar 90 may include non-planar features, such as an outer lip or rim portion and a recessed flat central portion, to facilitate alignment of the radiation detector units 210a and 210b on the frame bar 90. In some embodiments, the frame bar 90 may be attached to the radiation detector units 210a and 210b using a thermally conductive adhesive, such as a thermally conductive paste, and/or by mechanical connection structures (such as snap-in connectors, screws, and/or bolts and nuts). The detector module 200 may further include a module circuit board 220 as described above with reference to FIGS. 3A and 3B. The detector module 200 may be attached to the frame bar 90 such that the module circuit board 220 may extend away from the rear side of the frame bar 90. Electrical connections between the respective radiation detector units 210a, 210b and the module circuit board 220 of the detector module 200 may be made via electrical connectors 227 and 228.

In the embodiment detector modules 200 described above with reference to FIGS. 3A-5, the electrical connections to the ASIC 130 are made via the front side surface of the ASIC 130. Thus, no conductive via structures, such as through-silicon vias (TSVs), may extend from the backside of the ASIC 130 through the semiconductor material substrate of the ASIC 130. In alternative embodiments, at least some of the electrical connections to the ASIC 130 may be through the backside of the ASIC 130. In some embodiments, one or more electrical conductors, such as conductive traces, may extend along the length of radiation detector unit 210, such as over the backside surface of the carrier board(s) 60. Via structures through the carrier board 60 and/or through the substrate of the ASIC 130 may electrically connect the conductors to the ASIC 130. Thus, electrical signals between the ASIC 130 and a carrier board 60 and/or module circuit board 220 may be made without requiring the signals to pass from the ASIC 130 through an interposer 40 as in the embodiment of FIGS. 3A-3B, or through wire bond connections 229 as in the embodiment of FIGS. 4A-5.

The system architectures of X-ray imaging systems 100 currently used in, for example, medical, security, and non-destructive test imaging have generally defined the physical and logical modularity and requirements of the detectors used in such X-ray imaging systems. In a typical system, there is a modularity hierarchy starting from an individual pixel detector 126, through the detector read-out circuitry (e.g., an ASIC 130), to a detector module 200. The detector modules 200 are typically identical units and are themselves components in a larger detector array 300. Each of the detector modules 200 are supplied power, controlled by a system host, and deliver a digital data stream of x-ray count data to an aggregation point located hierarchically-downstream of the detector module 200, which may be, for example a separate processing device located on or coupled to the detector array 300, and/or a central control unit 170/computing device 160 of the X-ray imaging system 100 as shown in FIG. 1A. This aggregation point typically serves a number of detector modules 200.

Current detector modules 200 have a limited need for programmable intelligence or computational capabilities. It is generally sufficient for the detector module 200 to be capable of responding to low level commands, where the primary functions of the detector module 200 include powering up to a given operational state and then, when commanded, beginning the x-ray detection and delivery of the count data stream. A capability to update the behavior of the detector module 200 through the host interface is also generally present.

However, the limitations of existing X-ray detector technology have become more evident with the introduction of energy-discriminating photon counting X-ray detectors, such as photon counting computed tomography (PCCT) detectors and imaging systems. Similar situations are emerging in security and non-destructive test applications where the spectral and enhanced resolution capabilities of energy-discriminating photon counting X-ray detectors are being deployed. In a photon counting system, there is a large (e.g., order of magnitude) increase in raw data, related to the arithmetic product of increased spatial resolution and spectral information. The detector complexity has likewise increased, creating a need to manage the manufacturing, testing, calibration, and field maintenance of these detectors more effectively and efficiently.

Various embodiments of the present disclosure include an X-ray detector module 200 having a local processing unit configured to provide real-time control and computational capabilities at the x-ray detector module 200. In various embodiments, by providing these capabilities in the detector module itself, as opposed to a component located downstream of the detector module 200, there may be an immediate cost reduction, opportunities to include additional features, and performance improvement opportunities not otherwise practical to implement.

In various embodiments, an X-ray detector module 200 including a local processing unit providing control and data processing capabilities in the module 200 may provide a modified system architecture for the X-ray imaging system in which the details of the operation of the detector modules 200 may be hidden from the rest of the X-ray imaging system by a layer of abstraction and encapsulation. This isolation of the X-ray detector modules 200 may provide improvements in the way non-ideal behaviour of the detector modules 200 may be detected, corrected, logged or otherwise mitigated. Various embodiments may also enable improved adaptation of the imaging system to application- and situational-specific requirements. In various embodiments, a local processing unit in the detector modules 200 may be used to provide field service activities, either as support for specific off-line situations (e.g., diagnostics, maintenance, calibration, etc.) or during application-specific (e.g., mission mode) situations (e.g., data stream compression, data stream encryption, system monitoring, etc.). In various embodiments, a local processing unit may perform processing operations (e.g., computations) on X-ray count data concurrently with the capture of the data at the detector module 200. This may provide a richer available dataset (e.g., spatial, temporal and/or behavioral data) that can expand the parameter space available for such processing while limiting the size of the data sent downstream of the detector module 200.

Figure 6:
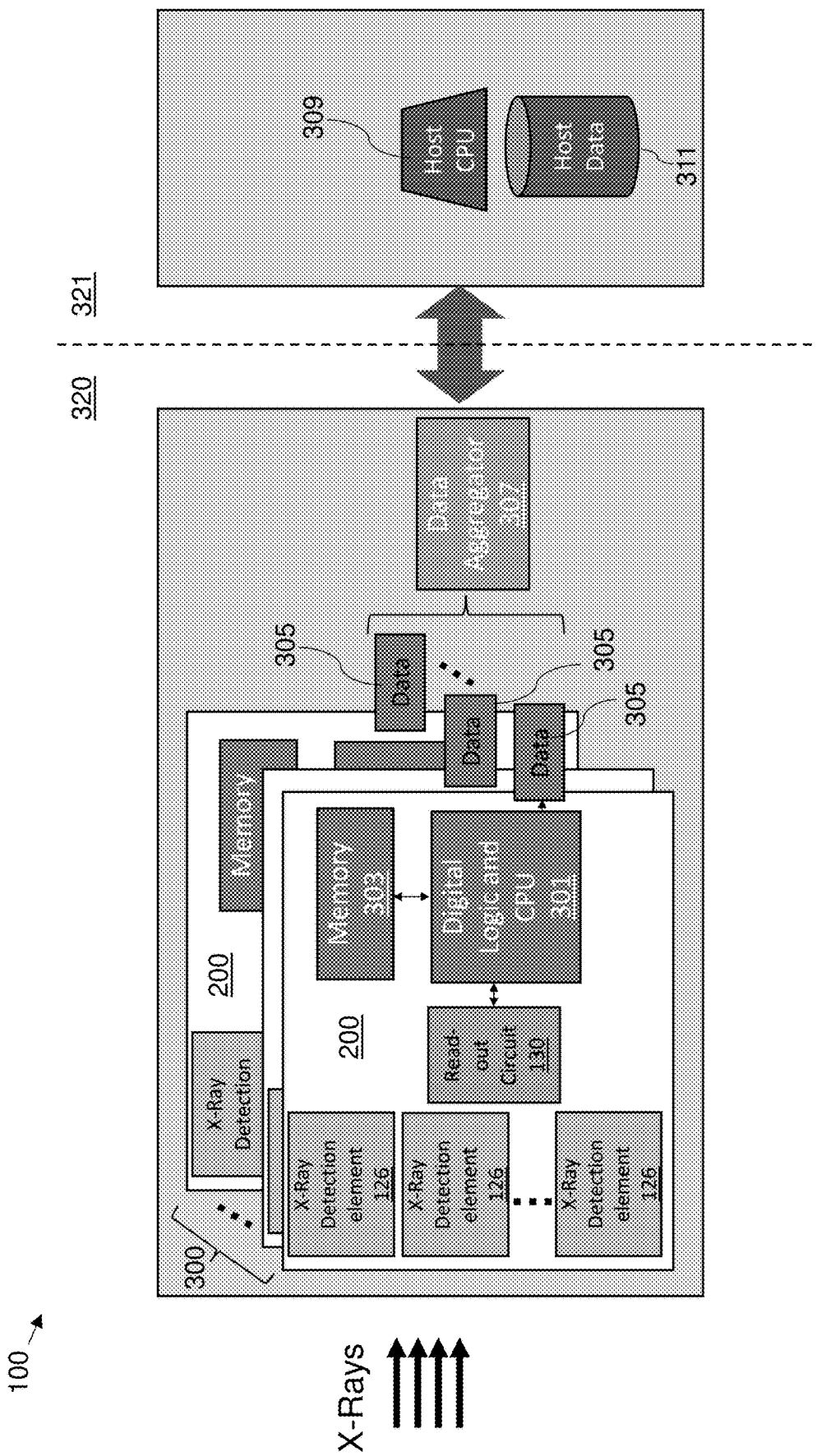
FIG. 6 is a system block diagram schematically illustrating an X-ray imaging system according to various embodiments of the present disclosure.

FIG. 6 is a system block diagram schematically illustrating an X-ray imaging system 100 according to various embodiments of the present disclosure. The exemplary embodiment shown in FIG. 6 includes a photon counting computed tomography (PCCT) X-ray imaging system that includes a rotating portion 320 (e.g., an imaging gantry) that rotates with respect to a stationary portion 321. It will be understood that a similar configuration may be utilized in other types of X-ray imaging systems used for medical, industrial and/or security applications. Referring to FIG. 6, the X-ray imaging system 100 includes an energy-discriminating X-ray detector array 300 located on the rotating portion 320 of the system 100. The detector array 300 includes a plurality of detector modules 200, where each detector module 200 includes a plurality of X-ray detection elements 126 (e.g., pixel detectors) which are part of the radiation sensors 80 and associated read-out circuitry (e.g., one or more above-described ASICs 130). In response to the detection of X-rays by the detector array 300, each detector module 200 of the array 300 may be configured to transmit a stream of digitized X-ray count data 305 to a downstream data aggregator 307 via a suitable wired or wireless data connection. In the embodiment of FIG. 6, the data aggregator 307 is located on the rotating portion 320 of the system 100, although it will be understood that in other embodiments the data aggregator may be located on the non-rotating portion 321 of the system 100.

Each of the detector modules 200 further includes a local processing unit 301 and an associated memory 303. The local processing unit 301 may include, for example, a programmable logic core on a field programmable gate array (FPGA), a fixed processing core that may reside in a FPGA System-on-Chip (SoC) component, and/or as a separately packaged micro-controller component. Other suitable processing devices may be used for the local processing unit 301. The memory 303 may include at least one suitable non-volatile or volatile memory component that may be configured to store processing instructions (e.g., programs) for execution by the local processing unit 301 as well as for storing additional data (e.g., configuration data, log data, etc.) that may be used by and/or generated by the local processing unit 301. The memory 303 may include, for example, static random-access memory (SRAM), dynamic random-access memory (DRAM), Flash memory, and/or any other type of volatile or non-volatile memory. In various embodiments, the local processing unit 301 may perform controller functions for controlling the operation of the detector module 200 and may also perform processing functions on the stream of digitized X-ray count data 305 prior to the data 305 being transmitted to the downstream data aggregator 307.

The X-ray imaging system 100 may further include a host CPU 309 and associated host data storage component 311 (e.g., memory). In the exemplary embodiment shown in FIG. 6, the host CPU 309 and the host data storage component 311 are located on the non-rotating portion 321 of the system, although it will be understood that in other embodiments the host CPU 309 and the host data storage component 311 may be located on the rotating portion 320 of the system 100. Aggregated digitized X-ray count data 305 may be transmitted from the data aggregator 307 to the host CPU 309 over a wired or wireless connection and may optionally be stored in the host data storage component 311. The host CPU 309 may be configured to perform processing operations (e.g., tomographic reconstruction) on the received X-ray count data 305 and/or to display X-ray images generated from the X-ray count data 305 on a suitable display device (not illustrated in FIG. 6). The host CPU 309 may also communicate with the local processing units 301 of each of the detector modules 200 of the detector array 300 via a suitable wireless or wireless connection.

Figure 7:
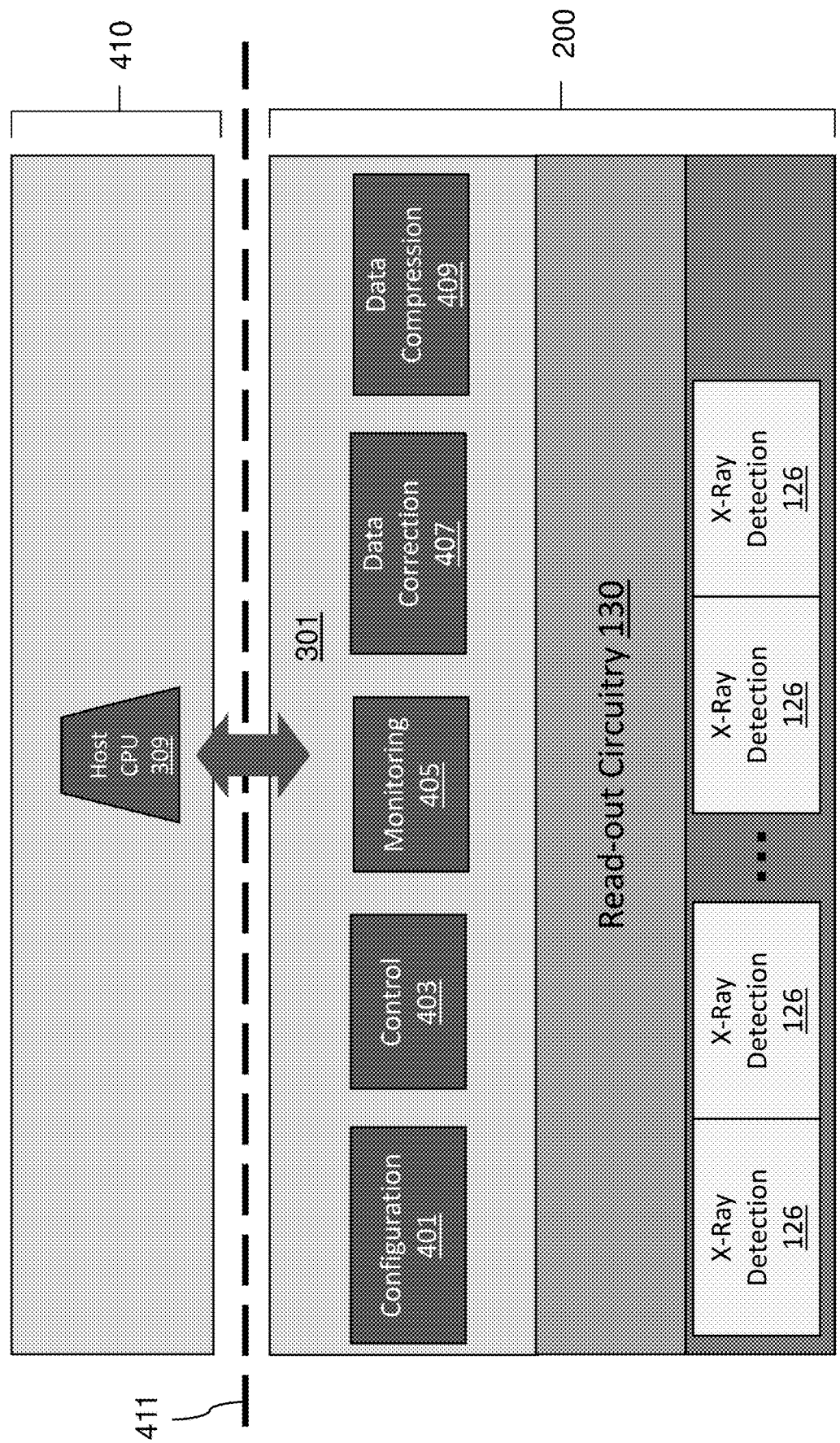
FIG. 7 is a block diagram schematically illustrating a detector module including a local processing unit according to various embodiments of the present disclosure.

FIG. 7 is a block diagram schematically illustrating a detector module 200 including a local processing unit 301 according to various embodiments of the present disclosure. The detector module 200 may be incorporated into an X-ray imaging system as described above. The other components of the X-ray imaging system, such as an above-described host CPU 309, are schematically indicated by box 410 in FIG. 7. The local processing unit 301 of the detector module 200 may communicate with the host CPU 309 of the imaging system via a suitable communications protocol that enables the exchange of data and control signals between the local processing unit 301 and the host CPU 309.

FIG. 7 schematically illustrates a plurality of functional components 401, 403, 405, 407, 409 of the detector module 200 that may be implemented using the local processing unit 301. The functional components in the embodiment of FIG. 7 include a configuration component 401, a control component 403, a monitoring component 405, a data correction component 407, and a data compression component 409, which are each described in further detail below. It will be understood that a detector module 200 according to various embodiments may include only some of the above-identified functional components 401, 403, 405, 407, 409 and/or may also include additional functional components. In various embodiments, the working details of the implementation of the functional components 401, 403, 405, 407, 409 of the detector module 200 may be hidden from the host CPU 309 and other components of the X-ray imaging system by an abstraction layer as schematically indicated by dotted line 411 in FIG. 7.

Referring again to FIG. 7, in various embodiments, the local processing unit 301 may implement a configuration component 401 that may perform configuration and management operations for the detector module 200. In particular, detector configuration and/or correction values which may be specific to the detector module 200 may be stored locally on the detector module 200 itself (e.g., in a local memory 303 shown in FIG. 6). Thus, from the perspective of other components of the imaging system, such as the host CPU 309, the detector module 200 may be abstracted as a self-contained object that includes all of the information necessary for configuration and management of the module 200. In some embodiments, the host CPU 309 may control the configuration and management of the detector module 200 through an application programming interface (API). Accordingly, the overhead required to find and load particular configuration and/or correction values for the detector module(s) 200 of the imaging system, which are often located in external system files, may be shifted from the central host CPU 309 to the detector modules 200 themselves. This detector-dependent information may be hidden from host CPU 309, which may significantly simplify the configuration of the detector modules 200 of the imaging system.

In various embodiments, the configuration component 401 of the detector module 200 may configure the detector module 200 in response to a high-level command, such as an application programming interface (API) function call, received from the host CPU 309. In some embodiments, an API function call from the host CPU 309 may call for use of a specific configuration of energy photon bins, calibrations, corrections, related to a supported specific detector response use case. In response, the local processing unit 301 of the detector module 200 may retrieve stored configuration and/or correction values associated with the supported detector response use case from local memory 303 and may configure components of the electronics subsystem of the detector module 200 to provide the requested detector response. The details of the implementation of this configuration may be hidden from the host CPU 309. In some embodiments, a plurality of pre-determined detector response use cases may be supported by the detector module 200, where each may be associated with a unique identifier and/or a unique API function call available to the host CPU 309.

Alternatively, or in addition, an API function call from the host CPU 309 may call for an arbitrary configuration of multi-bin energy thresholds, calibrations, correctors, and/or detector response functions. In particular, in cases where a configuration is not currently supported by the detector module 200, the host CPU 309 may issue one or more API function calls to request customized settings and/or parameters for the detector module 200. In response, the configuration component 401 may configure the detector module 200 with the requested customized settings and/or parameters.

In some embodiments, the host CPU 309 may manage the configuration component 401 of the detector module 200 through one or more API function calls. For example, the host CPU 309 may issue an API function call that calls for the configuration component 401 to add, modify and/or delete specific configurations or detector response use cases that are supported by detector module 200. In response, the local processing unit 301 of the detector module 200 may update configuration data for the detector module 200 that is stored in local memory 303. In cases where the API function call calls for the addition of new configuration(s) and/or detector response use case(s), and/or the modification to existing configuration(s) and/or detector response use case(s), the local processing unit 301 of the detector module 200 may store updated configuration data in the local memory 303 in association with a unique identifier and/or a unique API function call such that the host CPU 309 may request implementation of the new or updated configuration(s) and/or detector response use case(s) via subsequent API function calls. In various embodiments, one or more API function calls from the host CPU 309 may also be used to perform additional configuration management functions for the detector module 200, such as enabling unique and/or common identification of data or files via a hash function, as well as performing field updates to the detector module 200, which may include, for example, updating, installing or otherwise modifying software programs and applications that may be executed by the local processing unit 301 of the detector module 200.

Referring again to FIG. 7, in various embodiments, the local processing unit 301 may implement a control component 403 that may be configured to perform a sequence of tasks at power up, on demand, and/or in parallel with the collection of X-ray count data by the detector module 200. In some embodiments, the control component 403 may control and manage internal resources of the detector component, including the flow of data between the local processing unit 301 and other components internal and/or external to the detector module 200, such as the local memory 303, other components of the detector module electronics subsystem (e.g., the ASIC 130), and the host CPU 309. In some embodiments, the control component 403 may initiate and support module configuration management operations by the configuration component 401, such as via built-in self configuration (BISC) routine that may be initiated upon power-up of the detector module 200 and/or on demand (e.g., in response to an above-described API function call). In some embodiments, the control component 403 may implement a built-in self-test (BIST) routine that may include a hardware level check of logical functionality, timing, DC levels and/or calibration circuits of the detector module 200. The BIST routine may be automatically initiated upon power-up of the detector module 200 and/or may be initiated on demand (e.g., in response to an API function call from the host CPU 309). In some embodiments, the control component 403 may implement a built-in self-calibration routine that may include performing electrical and detector performance calibrations of the detector module 200, which may include, for example, calibration of background counts of the detector module 200. The built-in self-calibration routine may be automatically initiated upon power-up of the detector module 200 and/or may be initiated on demand (e.g., in response to an API function call from the host CPU 309).

In some embodiments, the control component 403 may initiate and support module monitoring operations by a monitoring component 405 that may be configured to capture performance-related data and monitor for possible fault conditions in the detector module 200 as described in further detail below. In some embodiments, the control component 403 may initiate a built-in self-monitoring (BISM) routine that may include set-up and enabling of specified data relating to the performance of the detector module 200 to be recorded (e.g., logged) and/or by defining thresholds indicative of abnormal behavior or possible fault conditions. The BISM routine may be automatically initiated upon power-up of the detector module 200 and/or may be initiated on demand (e.g., in response to an API function call from the host CPU 309).

Referring again to FIG. 7, in various embodiments, the local processing unit 301 may implement a monitoring component 405 that may be configured to perform self-monitoring of the performance of the detector module 200. In various embodiments, the monitoring component 405 may be configured to record and/or perform real-time monitoring of data related to the performance of the detector module 200. In some embodiments, the monitoring component 405 may monitor the data related to the performance of the detector module 200 to determine whether a change in the monitored data exceeds a pre-determined threshold that is indicative of non-ideal behavior or a possible fault condition in the detector module 200. Examples of changes in data related to the performance of the detector module 200 that may be monitored may include, without limitation, increases in error corrections (e.g., number of non-conforming pixels (NCPs)) indicating degradation of module performance, changes or systematic shifts in energy calibrations, changes or systemic shifts in background counts, as well as changes HV bias currents, power up response and/or training response. The pre-determined threshold(s) may be defined in terms of a magnitude or the detected change(s), a rate of the detected change(s) and/or as a combination of both. In response to determining that a change in the monitored data exceeds a pre-determined threshold, in some embodiments, the monitoring component 405 may generate a warning signal, which may be transmitted in real-time over a communications channel to the host CPU 309. The warning signal may identify the specific non-ideal behavior that is detected, which may aid in diagnosis and remediation of the issue. In some embodiments, the local processing unit 301 of the detector module 200 may be able to address the issue itself via a correction component 407, as described in further detail below. Alternatively, or in addition, the monitoring component 405 may record all or a portion of the monitored data in local memory 303, such as in the form of log files, that may be subsequently exported or otherwise accessed for remote analysis to identify, for example, service triggers, predictive failures and/or re-calibration estimation.

Referring again to FIG. 7, in various embodiments, the local processing unit 301 may implement a data correction component 407 that may be configured to correct for non-ideal behavior of the detector module 200. This may remove the need for such corrections to be addressed downstream of the detector module 200 within the X-ray imaging system 100, which may save time and costs of data transmission. Various corrections to non-ideal behavior that may be performed by the data correction component 407 may include providing corrected count values for known bad (i.e., non-conforming) sub-pixels within a macro pixel. For example, in situations in which a particular sub-pixel of a macro-pixel is determined to exhibit abnormal behavior, the count values for that sub-pixel may be interpolated by calculating an average (e.g., median or mean) of count values of surrounding sub-pixels. Other corrections to non-ideal behavior that may be performed by the data correction component 407 may include, without limitation, performing spatial interpolation (e.g., N, S, E, W) of neighboring sub-pixels within a micro pixel, performing time domain interpolation to remove data transient exceptions, and performing corrections for spectral drift.

In various embodiments, applying a time domain interpolation, for example, may include smoothing the output count data in the time domain to correct for "bumps" in the output data due to one or more faulty or non-conforming pixels. In particular, in the case of PCCT imaging, as the X-ray source 110 and detector array 300 rotate with respect to the patient 10, the location of each pixel 126 relative to each three-dimensional volume (i.e., "voxel") of the patient 10 changes over time. In other words, multiple pixels 126 along a given row of pixels (e.g., along the X-axis direction in FIG. 3) will "see" the same or substantially the same portion of the patient 10 at different times as the source 110 and detector array 300 rotate with respect to the patient 10. In cases where the output count of a given pixel 126 varies significantly (e.g., above a predetermined threshold value) relative to the output counts of other pixels "viewing" the same portion of the patient 10 in prior and/or subsequent data collection periods (e.g., frames), it may be assumed that the given pixel 126 is defective, and the output count for the given pixel 126 may be corrected by providing an average output count of multiple pixels "viewing" the same region(s) of the patient 10 at different times. This is an example of a correction that may be implemented locally at the detector module 200 using a local processing unit 301 due to the rich dataset that is available at the detector module 200, and which would otherwise be costly and impractical to implement by sending all of the required data to a host CPU 309 for downstream processing.

Spectral drift is an undesirable phenomenon in which the measured energy spectra (which, in practice, may be represented by the distribution of counts across the different energy bins) changes over time. In various embodiments, performing corrections for spectral drift may include determining that a spectral drift has occurred by examining individual bin counts and comparing them to the sum of counts across all bins over time and adjusting the energy thresholds to compensate for any identified spectral drift.

In some embodiments, one or more real-time corrections to the output data from the data module 200 may be implemented by the data correction component 407 in response to a command or request (e.g., an API function call) from the host CPU 309.

Referring again to FIG. 7, in various embodiments, the local processing unit 301 may implement a data compression component 409 that may be configured to perform data compression on the output count data stream from the detector module 200 in order to more efficiently utilize the bandwidth of the data communication channel(s) of the imaging system 100. By providing a data compression capability at the detector module 200, the overall cost, data transmission and/or power consumption of the imaging system 100 may be reduced. In some embodiments, a compression and/or encryption algorithm may be implemented using logic gates located within the data path of the count data to minimize interference with an embedded controller (e.g., an above-described control component 403) of the local processing unit 301 in terms of power usage, real-time latency, and utilization. The control component 403 may manage the compression functions of the logic gates such that real-time performance constraints of the compression process may be satisfied. The control component 403 may also manage an encryption key system in embodiments in which encryption of the count data is utilized.

In some embodiments, the data compression component 409 may be configured to provide lossless data compression on the output count data stream using a standard or general purpose data compression algorithm. Alternatively, or in addition, the data compression component 409 may be configured to provide lossless data compression using codecs tuned to the attributes of the output data stream. The compressed data stream from the detector module 200 may be encrypted or unencrypted. In some embodiments, the compressed data stream may be encoded to enable forward error detection and correction.

Figure 8:
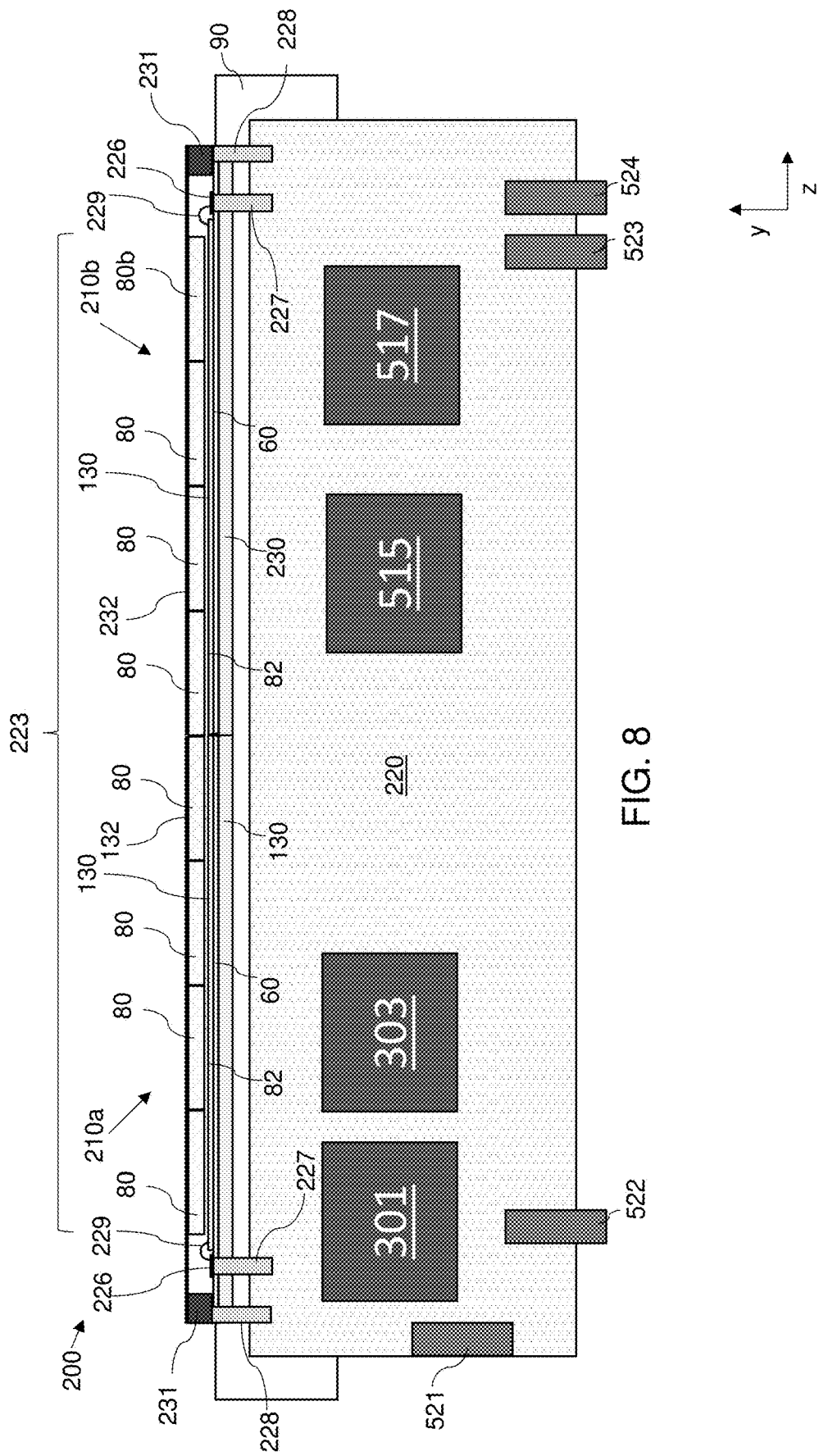
FIG. 8 is a side view of a detector module schematically illustrating a local processing unit and memory located on a module circuit board according to one embodiment of the present disclosure.

As discussed above, in various embodiments, the local processing unit 301 and an associated memory 303 may be located on a detector module 200 rather than in a downstream location of the detector array 300 or imaging system 100. FIG. 8 is a side view of a detector module 200 which schematically illustrates a local processing unit 301 and memory 303 located on an above-described module circuit board 220 according to one embodiment of the present disclosure. The detector module 200 in this embodiment may have a similar architecture as the detector module 200 described above with reference to FIG. 5, although it will be understood that a local processing unit 301 and memory 303 may be located on the module circuit board 220 of a detector module 200 as shown in FIG. 3B. In this embodiment, the module circuit board 220 includes an interface/configuration port 521, such as a JTAG port, a data input/output connector 522, a low voltage power connector 523, and a high voltage power connector 524. The module circuit board 220 may also include a low voltage power supply 515 (e.g., for providing the low voltage to the first electrical connector(s) 227), a high voltage power supply 517 (e.g., for providing the high voltage to the second electrical connector(s) 228), the local processing unit 301 and the memory 303.

Figure 9:
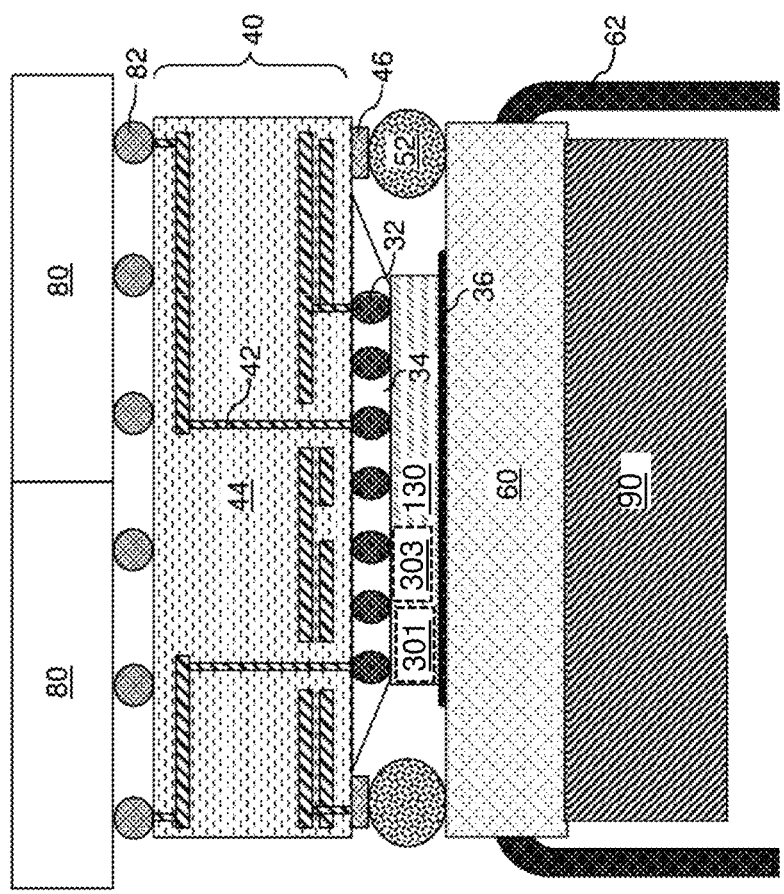
FIG. 9 illustrates an alternative embodiment of a detector module in which a local processing unit and a memory are integrated with the detector read-out circuitry according to an embodiment of the present disclosure.

FIG. 9 illustrates an alternative embodiment of a detector module 200 in which a local processing unit 301 and a memory 303 are integrated with the detector read-out circuitry (e.g., ASIC 130). In various embodiments, this may increase the complexity of the read-out circuitry, but may provide the advantage of reducing the data throughput that is streamed out of the read-out circuitry. Implementation of a local processing unit 301 in the read-out circuitry may involve hard wiring the processing engine of the local processing unit 301, and or using an on-chip programmable block, such as an embedded FPGA or microprocessor, in the read-out circuitry (e.g., one or more ASICs 130 of the detector module 200). A separate memory device, such as a Flash memory device, may also be provided on or integrated with the read-out circuitry. In an embodiment such as shown in FIGS. 4A-4B, the local processing unit 301 may be located in the core circuit blocks of the monolithic ASICs 130. Thus, in some embodiments, such as in embodiments in which the ASIC 130 is fabricated using a "stitching" process as described above, each core circuit block of the ASIC 130 may include an identical instance of the local processing unit 301. In other embodiments, the local processing unit 301 and/or a local memory 303 may be located in other locations on the detector module 200, such as on an above-described carrier board 60.

Referring to all drawings of the present disclosure and according to an aspect of the present disclosure, an X-ray imaging system 100 is provided. The X-ray imaging system 100 in various embodiments may include a computed tomography system having a radiation source 110 configured to emit an X-ray beam, a detector array 300 including a plurality of detector modules 200 configured to receive the X-ray beam from the radiation source 110 through an intervening space configured to contain an object 10 therein (e.g., through the support 105), and an image reconstruction system including a computer 160 configured to run an automated image reconstruction algorithm on detection signals generated from the detector array 300, which can be employed as the detector array 300 in the system of FIG. 1.

The devices of the embodiments of the present disclosure can be employed in various radiation detection systems including computed tomography (CT) imaging systems. Any direct conversion radiation sensors may be employed such as radiation sensors employing Si, Ge, GaAs, CdTe, CdZnTe, and/or other similar semiconductor materials.

The radiation detectors of the present embodiments may be used for medical imaging, such as in Low-Flux applications in Nuclear Medicine (NM), whether by Single Photon Emission Computed Tomography (SPECT) or by Positron Emission Tomography (PET), or as radiation detectors in High-Flux applications as in X-ray Computed Tomography (CT) for medical applications, and for non-medical imaging applications, such as in baggage security scanning and industrial inspection applications.

While the disclosure has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

The invention claimed is:

1. A detector module, comprising:
   at least one radiation sensor;
   a read-out circuit coupled to the at least one radiation sensor and configured to receive event detection signals from the at least one radiation sensor and to convert the event detection signals to digital detection signals; and
   a local processing unit configured to control the operation of the detector module and to perform processing operations on the digital detection signals prior to transmitting the digital detector signals from the detector module.

2. The detector module of claim 1, wherein the local processing unit is configured to transmit the digital detection signals from the detector module to a downstream aggregation component that is configured to aggregate digital detection signals from multiple detector modules of a detector array.

3. The detector module of claim 1, wherein the local processing unit comprises at least one of a programmable logic core on a field programmable gate array (FPGA), a fixed processing core located in a FPGA System-on-Chip (SoC) component, and a separately-packaged micro-controller component.

4. The detector module of claim 1, further comprising a memory coupled to the local processing unit.

5. The detector module of claim 1, wherein the local processing unit is configured with processor-executable instructions configured to cause the local processing unit to perform operations comprising at least one of:
   configuration and management operations for the detector module;
   control operations for the detector module;
   self-monitoring of the performance of the detector module;
   correction of non-ideal behavior of the detector module; or
   data compression of the digital detector signals transmitted by the detector module.

6. The detector module of claim 5, wherein the local processing unit is configured with processor-executable instructions configured to cause the local processing unit to perform operations comprising configuring the detector module in response to a high-level command received by the detector module from a host CPU of an imaging system.

7. The detector module of claim 6, wherein configuring the detector module comprises accessing detector-dependent information required to configure the detector module from a local memory of the detector module.

8. The detector module of claim 7, wherein details of the implementation of the configuration of the detector module are hidden from the host CPU by a layer of abstraction.

9. The detector module of claim 6, wherein the high-level command received by the detector module comprises an application programming interface (API) function call from the host CPU requesting a specific configuration of energy photon bins, calibrations and/or corrections related to a specific detector response use case supported by the detector module.

10. The detector module of claim 6, wherein the high-level command received by the detector module comprises an API function call from the host CPU requesting an arbitrary configuration of energy photon bins, calibrations, corrections and/or detector response functions.

11. The detector module of claim 6, wherein the high-level command received by the detector module comprises an API function call from the host CPU requesting management of configuration operations by the detector module.

12. The detector module of claim 11, wherein the management of configuration operations by the detector module comprises at least one of storing updated configuration data in a local memory of the detector module, enabling unique and/or common identification of data or files via a hash function, and performing field updates to the detector module.

13. The detector module of claim 5, wherein the local processing unit is configured with processor-executable instructions configured to cause the local processing unit to perform control operations comprising performing a sequence of tasks at power up, on demand, and/or in parallel with the collection of digital detection signals by the detector module.

14. The detector module of claim 13, wherein the sequence of tasks comprises implementing a built-in self-configuration (BISC) routine upon power-up of the detector module and/or on demand.

15. The detector module of claim 13, wherein the sequence of tasks comprises implementing a built-in self-test (BIST) routine the comprises a hardware level check of logical functionality, timing, DC levels and/or calibration circuits of the detector module.

16. The detector module of claim 13, wherein the sequence of tasks comprises implementing a built-in self-calibration that includes performing electrical and detector performance calibrations of the detector module.

17. The detector module of claim 13, wherein the sequence of tasks comprises implementing a built-in self-monitoring (BISM) routine to capture performance-related data and monitor for abnormal behavior of the detector module.

18. The detector module of claim 5, wherein the local processing unit is configured with processor-executable instructions configured to cause the local processing unit to perform self-monitoring operations comprising recording and/or performing real-time monitoring of data related to the performance of the detector module.

19. The detector module of claim 18, wherein recording data relating to the performance of the detector module comprises recording all or a portion of the data in a local memory for subsequent analysis to identify service triggers, predictive failures and/or recalibration estimation.

20. The detector module of claim 18, wherein performing real-time monitoring of data related to the performance of the detector module comprises determining whether a change in the monitored data exceeds a pre-determined threshold that is indicative of a non-ideal behavior or possible fault condition of the detector module.

21. The detector module of claim 20, wherein the local processing unit is configured to transmit a real-time warning signal to the host CPU in response to determining that a change in the monitored data exceeds the pre-determined threshold.

22. The detector module of claim 20, wherein the change in the monitored data comprises at least one of an increase in a number of non-conforming pixels, a systemic shift in energy calibrations, a change in high-voltage bias currents, a change in power-up response and a change in training response.

23. The detector module of claim 5, wherein the local processing unit is configured with processor-executable instructions configured to cause the local processing unit to perform data correction operations to correct for non-ideal behavior of the detector module.

24. The detector module of claim 23, wherein the data correction operations comprise at least one of providing corrected count values for known non-conforming sub-pixels within a macro pixel, performing spatial interpolation of neighboring sub-pixels within a macro pixel, performing time domain interpolation to remove data transient exceptions, and performing corrections for spectral drift.

25. The detector module of claim 5, wherein the local processing unit is configured with processor-executable instructions configured to cause the local processing unit to perform data compression operations on the digital event signals transmitted by the detector module.

26. The detector module of claim 25, wherein the data compression operations comprise at least one of performing lossless data compression of the digital event signals using a standard or general purpose data compression algorithm, performing lossless data compression using a codec tuned to the attributes of the digital event signals, performing encryption of the digital event signals, and encoding the digital event signals to enable forward error detection and correction.

27. The detector module of claim 1, further comprising a module circuit board electrically coupled to the read-out circuit, wherein the local processing unit is located on the module circuit board.

28. The detector module of claim 1, wherein the local processing unit is physically integrated with the read-out circuit.

29. A detector array for an imaging system, comprising:
a plurality of detector modules according to claim 1, wherein the radiation sensors of the plurality of detector modules form a continuous detector surface of the detector array.

30. An X-ray imaging system, comprising:
an radiation source configured to emit an X-ray beam; and
a detector array including a plurality of detector modules according to claim 1 that are configured to receive the X-ray beam from the radiation source through an intervening space configured to contain an object therein.

31. The X-ray imaging system of claim 30, wherein the X-ray imaging system comprises a photon-counting computerized tomography (PCCT) imaging system comprising an image reconstruction system including a computer configured to run an automated image reconstruction algorithm on event detection signals generated by the detector modules of the detector array.

32. The X-ray imaging system of claim 31, further comprising a host CPU configured to communicate with the local processing units of each of the detector modules of the detector array.

* * * * *